(12) United States Patent
Bratton

(10) Patent No.: US 8,327,596 B2
(45) Date of Patent: Dec. 11, 2012

(54) CONNECTOR SYSTEM FOR BUILDING STUDS

(75) Inventor: Mark Bratton, Fargo, ND (US)

(73) Assignee: Tecton Products, LLC, Fargo, ND (US)

( * ) Notice: Subject to any disclaimer, the term of this patent is extended or adjusted under 35 U.S.C. 154(b) by 88 days.

(21) Appl. No.: 12/361,515

(22) Filed: Jan. 28, 2009

(65) Prior Publication Data

US 2010/0186346 A1 Jul. 29, 2010

(51) Int. Cl.
 E04C 2/34 (2006.01)
 E04C 2/38 (2006.01)
 E04H 1/00 (2006.01)
 E04H 12/00 (2006.01)
 E04B 1/38 (2006.01)
 F16B 9/00 (2006.01)
 F16B 7/00 (2006.01)
 H01R 4/50 (2006.01)

(52) U.S. Cl. ....... 52/481.1; 52/481.2; 52/241; 52/655.1; 52/656.9; 52/710; 403/252; 403/255; 403/292; 403/308

(58) Field of Classification Search .............. 52/241, 52/481.1, 481.2, 655.1, 656.9, 710, 712; 403/264, 252, 255, 292, 294, 308
See application file for complete search history.

(56) References Cited

U.S. PATENT DOCUMENTS

| | | | | |
|---|---|---|---|---|
| 2,106,084 | A * | 1/1938 | Coddington | 52/376 |
| 6,481,177 | B1 * | 11/2002 | Wood | 52/656.9 |
| 6,792,733 | B2 * | 9/2004 | Wheeler et al. | 52/656.1 |
| 7,127,862 | B2 * | 10/2006 | Saldana | 52/715 |
| 7,451,575 | B2 * | 11/2008 | Hall et al. | 52/289 |
| 7,533,508 | B1 * | 5/2009 | diGirolamo et al. | 52/481.1 |
| 7,690,167 | B2 * | 4/2010 | Antonic | 52/481.1 |
| 2002/0148191 | A1 * | 10/2002 | Hynes | 52/729.1 |
| 2007/0137134 | A1 * | 6/2007 | Plagemann et al. | 52/656.9 |

* cited by examiner

Primary Examiner — Brian Glessner
Assistant Examiner — Omar Hijaz
(74) Attorney, Agent, or Firm — Schwegman Lundberg & Woessner, P.A.

(57) ABSTRACT

A structural building system includes a plurality of pultruded fiberglass reinforced structure components configured to be used as a structural frame member of a building and a plurality of connectors. Each connector is configured to be mounted to one end of a first pultruded structural component and includes a mounting section that is couplable to a second pultruded structural component so as to connect the first and second structural components at right angles to each other.

6 Claims, 11 Drawing Sheets

CONNECTOR SYSTEM FOR BUILDING STUDS

FIELD

This application relates generally to building products and more specifically to a structural wall building system to construct exterior or interior walls for a residential or commercial building.

BACKGROUND

Residential and commercial buildings have been typically constructed from wood and steel components (studs), which are assembled with fasteners to create wall sections. These wall sections are built to meet the design requirements of the home, i.e. length of walls, door and window openings, plumbing walls and architectural features. These wood and steel components are often fabricated and assembled at the construction location per a set of building documents. The cross section of studs come in two sizes, 2×4 and 2×6. The 2×4 actual dimension is 1.5 by 3.5 inches and the 2×6 actual dimension is 1.5 by 5.5 inches. The 2×6 is often used as the exterior wall, depending on the location in the United States, local code and insulation requirements. The 2×4 size is typically used to construct interior walls and in southern states the exterior walls. The configuration of the wall being constructed from studs depends on the structural and design requirements in the building.

A typical wall assembly is built flat on the floor and is then lifted and set in place. A typical wall assembly begins with a horizontal component "sill plate", which provides the lateral support for the wall assembly and provides the ability to fasten the lower part of the wall to floor, joists or concrete wall. When a wood "sill plate" comes in contact with concrete it is required that it is manufactured from rot resistant treated wood. The vertical components of the wall assembly are fastened to the bottom horizontal members at pre-defined intervals, often 16 inches on center (OC). The vertical components are then again fastened to a horizontal component at the top of the wall section. The assembly of the structural wall components create the wall sections for interior and exterior wall construction.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined or that other embodiments may be utilized and that structural changes may be made without departing from the spirit and scope of the present invention. The following detailed description is, therefore, not to be taken in a limiting sense, and the scope of the present invention is defined by the appended claims and their equivalents.

Figure 1:
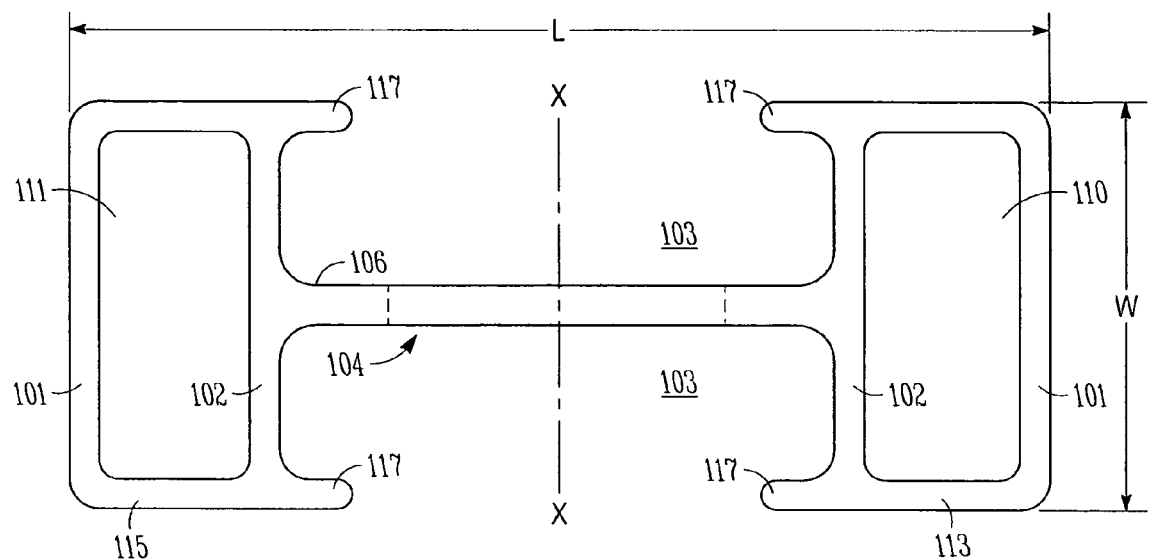
FIG. 1 shows a cross-section view of the structural wall component, "stud", in accordance with one embodiment. The size and internal configuration of the cross-section can vary depending on the structural and insulation requirements.

FIG. 1 shows a pultruded profile, cross section view of a structural wall stud component 100, in accordance with one embodiment. Structural stud component 100 is adapted to replace standard 2×4 or 2×6 wood studs for use as a structural frame member of a building. Although component 100 can have virtually any dimensions, in one embodiment, component 100 includes a length, L, of about 3.5 inches and a width, W, of about 1.5 inches. In one embodiment, component 100 includes a length, L, of about 5.5 inches and a width, W, of about 1.5 inches.

Component 100 generally includes a first end 113 and a second end 115. A central wall 106 extends between first end 113 and second end 115, thus forming an I-beam shape. Cavities or hollow areas 110, 111 in the structural wall component 100 provide insulating cavities. Double walls, 101 and 102, on each end of component 100 provide additional strength in the inward to outward direction of the structural wall component. In addition, the two walls 101 and 102 provide strength for fasteners that are used to attach exterior sheathing and interior wall finishes, such as drywall. For example, the outer surfaces of the walls are relatively flat so as to receive fasteners (such as a nail gun or screws) that can penetrate the first and/or second wall 101, 102 providing sufficient lateral and same-direction holding strength in the direction of the fastener.

Component 100 is a relatively lightweight member with a very good weight to strength ratio. The structure defined by hollow areas 110, 111 provides structural strength to the I-beam shaped component 100 while not adding any weight to the component. In one embodiment, walls 101 are about 0.125 inches thick and inner walls 102 are about 0.07 inches thick. In some embodiments, walls 101 can be about 0.150 inches or less, about 0.125 inches or less, about 0.100 inches less, or about 0.070 inches or less. In some embodiments, walls 102 can be about 0.150 inches or less, about 0.125 inches or less, about 0.100 inches less, or about 0.70 inches or less. In some embodiments central wall 106 can have a thickness of about 0.07 inches, or about 0.07 inches or less. In some embodiments, central wall 106 can be about 0.100 inches or less, about 0.125 inches or less, or about 0.150 inches or less. In some embodiments, walls 102 and 106 can be about 0.100 inches or less. In one embodiment, all the walls 101, 102, and 106 of the component can be about 0.125 inches or less. In one embodiment, all the walls 101, 102, and 106 of the component can be about 0.150 inches or less.

The double walls 101, 102 and resulting hollow cavities, 110, 111, are symmetrical in the x-x axis, providing non-handedness of the structural wall components. This feature allows processing of structural wall components 100 with minimal bow. Channels, 103, are pultruded in the full length of the structural wall component on either side of central wall 106 and partially defined by overhangs 117 on each end of the component 100. Channels 103 provide a recess for securing electrical wires through the walls, for example. In addition, the structural wall components 100 have holes, 104, drilled through the center wall 106 along the x-x axis. These holes, 104, can be spaced along the length of the structural wall component at 16" OC or another spacing length. The holes, 104, have multiple purposes. One purpose is that the holes can be used to install electrical cables through a structural wall section, for example.

Figure 2:
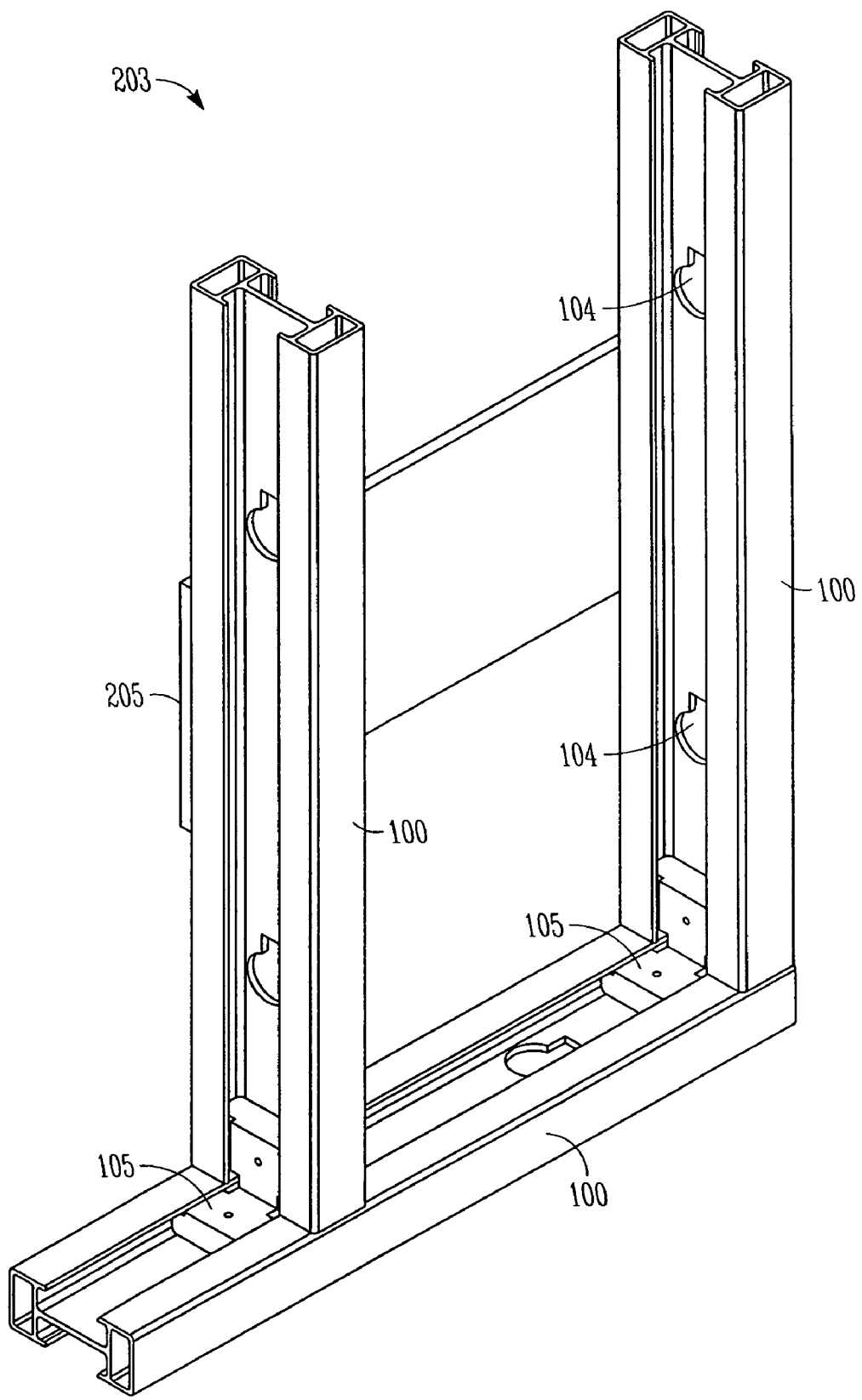
FIG. 2 shows a perspective view of structural wall components in a wall assembly, in accordance with one embodiment.
Figure 3:
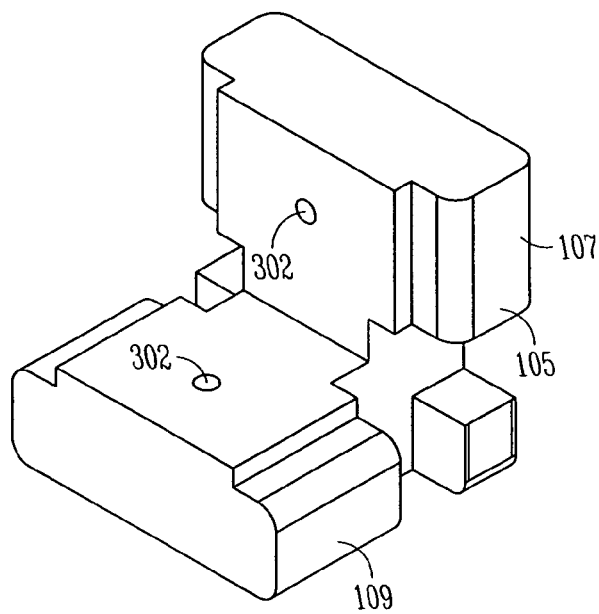
FIG. 3 shows a perspective view of a fastener component, in accordance with one embodiment.
Figure 4:
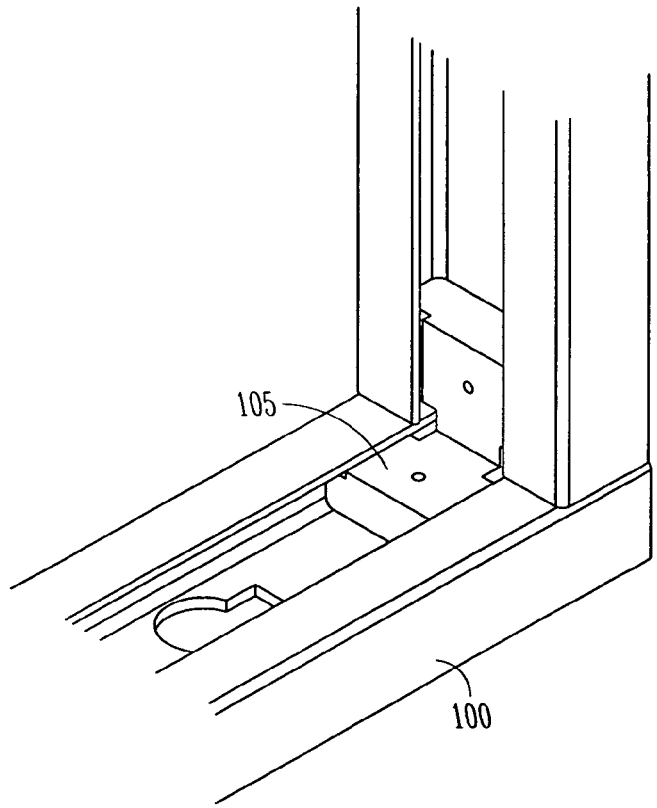
FIG. 4 shows a perspective view of a wall section, in accordance with one embodiment.
Figure 5:
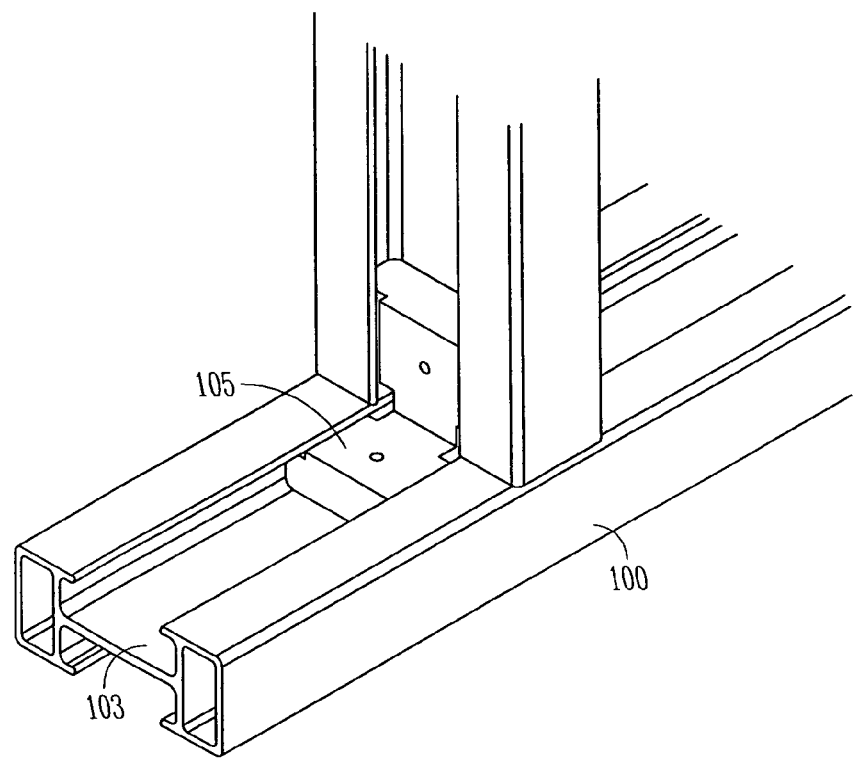
FIG. 5 shows a perspective view of a wall section, in accordance with one embodiment.

Referring to FIGS. 2-5, FIG. 2 shows a perspective view of structural wall components 100 configured in a wall assembly, in accordance with one embodiment; FIG. 3 show a perspective view of a fastener component 105, in accordance with one embodiment; and FIGS. 4 and 5 show further details of the wall assembly.

One purpose of holes 104 is that the 16"OC spaced holes 104 provide an alignment point for fastener components, 105, to assemble components 100 into a wall section 203. Fasteners 105, which can include an "L" shaped configuration, including a first wall 107 and a perpendicular wall 109, can be used to join two (2) pultruded structural wall components 100. The "L" shaped fastener component 105 is shaped and dimensioned to slide into channels 103 of components 100 for alignment and can be screwed or nailed to the components 100 to create a rigid intersection. The molded fasteners, 105, can be installed on every 16"OC hole, 104 and provide an automatic alignment and attachment method for the vertical structural wall components. Screws or nails can be used to fasten the structural wall component 100 to the fastener components 105 to ensure alignment and hold the vertical members to the horizontal members. In one embodiment, each wall of fastener components 105 include a hole 302 to receive a fastener. In one embodiment, fastener components 105 can be molded.

A partial view of a sheathing 205 is shown in FIG. 2 to exemplify one technique of applying sheathing over wall section 203. The same example applies to sheetrock or other covering. A nail gun or screws can be used to attach sheathing 205 to components 100 of wall section 103.

Figure 6:
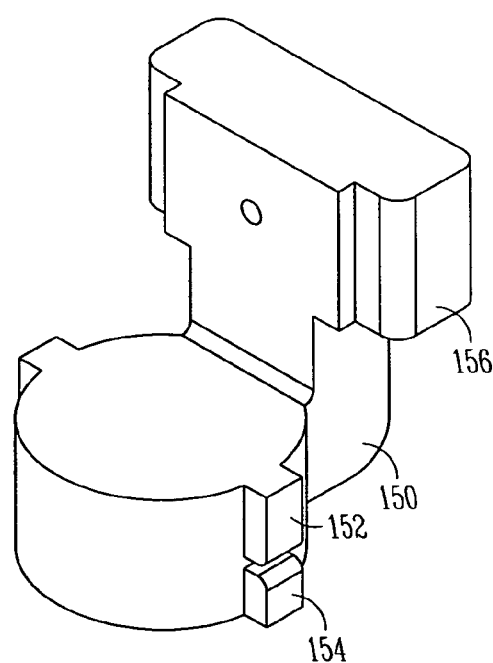
FIG. 6 shows a perspective view of a fastener component, in accordance with one embodiment.
Figure 7:
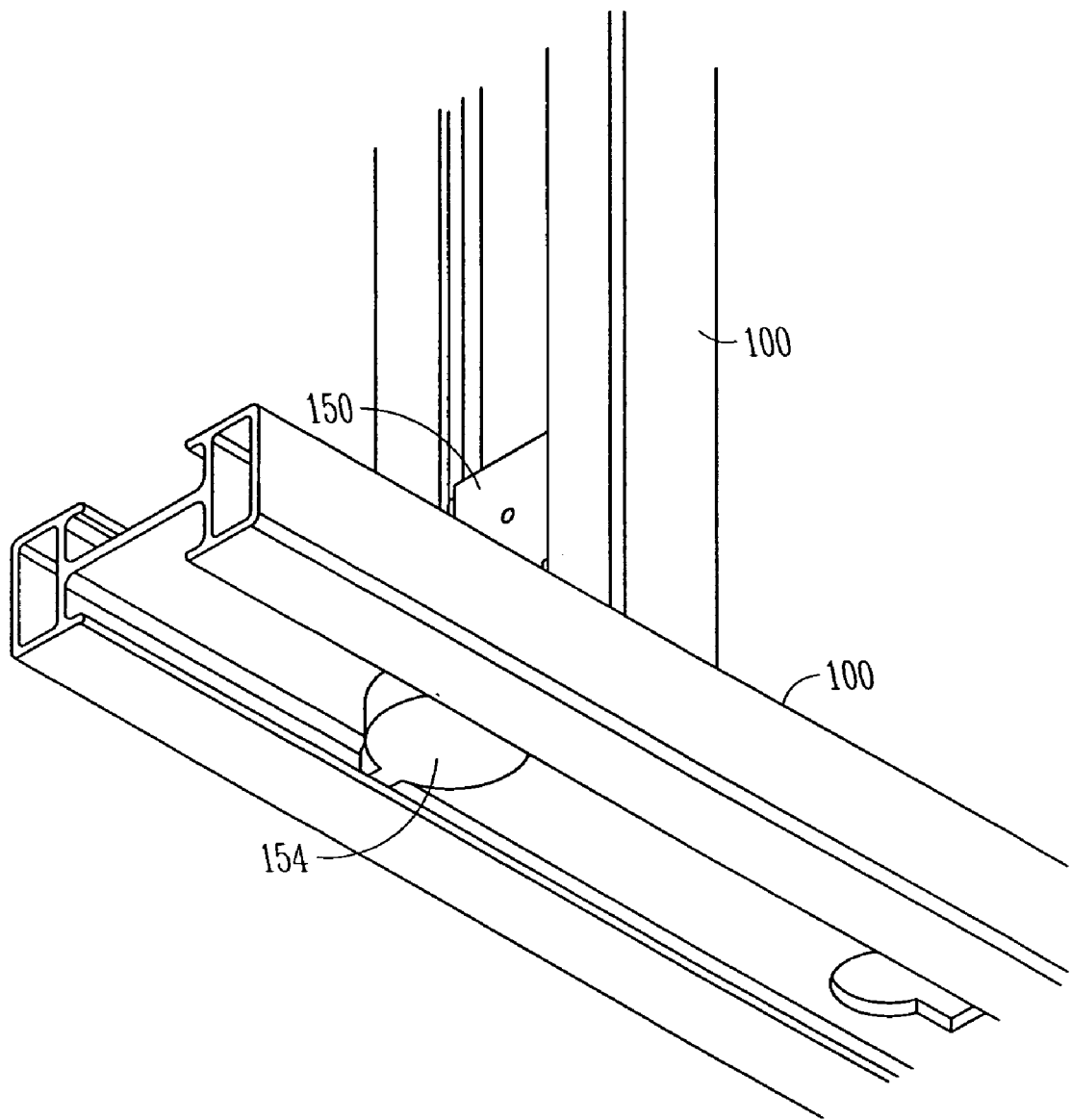
FIG. 7 shows a perspective view of a wall section, in accordance with one embodiment.
Figure 8:
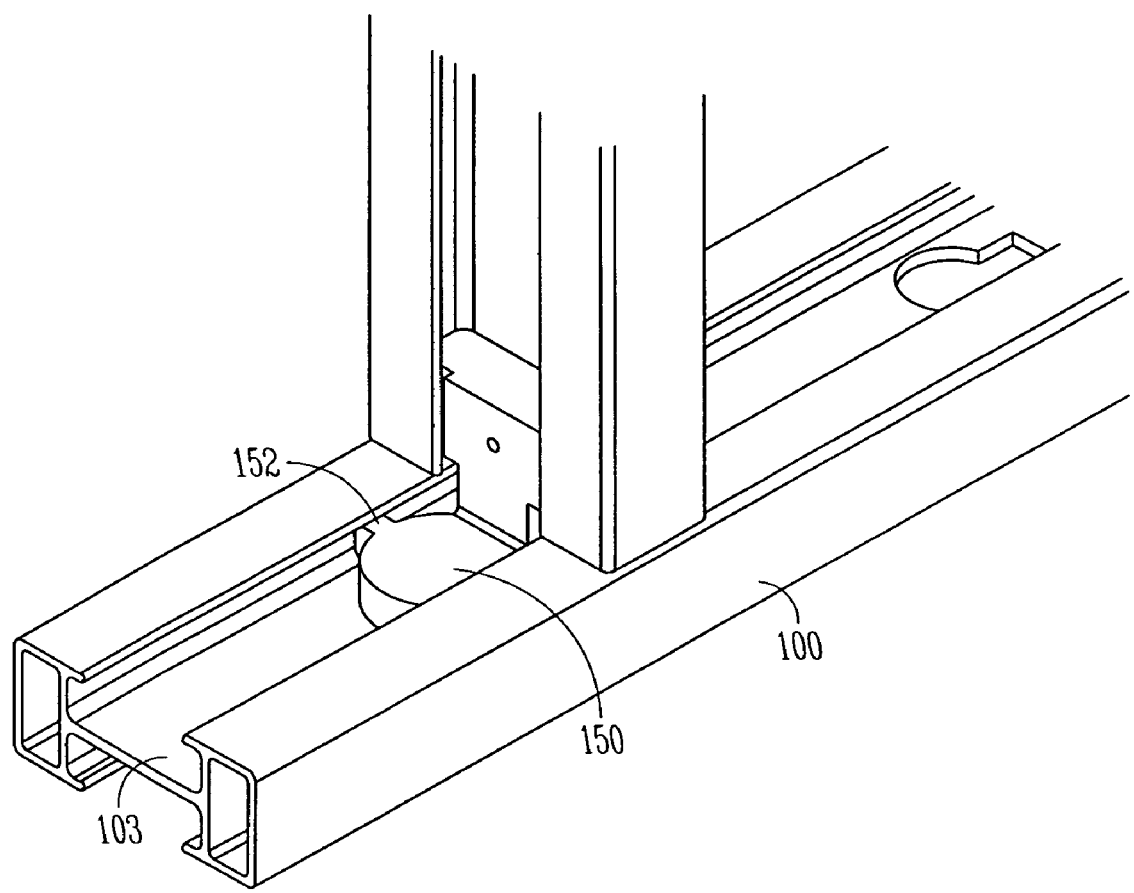
FIG. 8 shows a perspective view of a wall section, in accordance with one embodiment.

FIGS. 6-7 show a wall assembly using a fastener component 150, in accordance with one embodiment. In this example, molded fastener component 150 includes an upper wall 156 and a protruded knob 154 that is slightly smaller than the size of the hole, 104, in the structural wall component 100. The knob 154 can be put through the hole 104 and then slid into a keyed portion of the hole with a top part 152 resting in channel 103 and the knob 154 in the opposing channel 103 on the other side of the component 100. The molded fasteners, 150, can be installed on every 16"OC hole, 104 and provide and automatic alignment and attachment method for the vertical structural wall components.

An advantage of the pultruded structural wall component 100, discussed above, is that the length can be as long as it is manageable or shippable. Wood studs are limited by the size of available boards, trees and longer lengths become more expense due the limited availability of wood in longer lengths.

Figure 9:
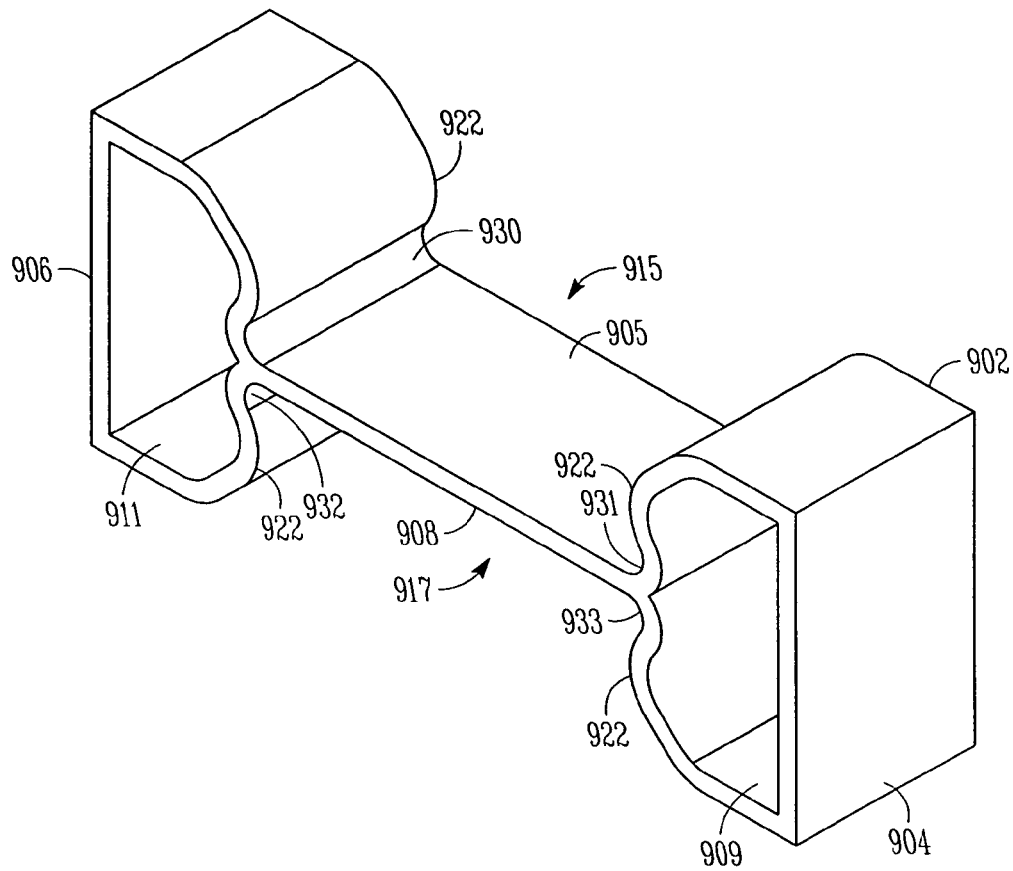
FIG. 9 shows a perspective cross-section view of a structural wall component, in accordance with one embodiment.

FIG. 9 shows a perspective cross-section view of a structural wall component 902, in accordance with one embodiment. Component 902 includes similar structure as component 100 discussed above and certain details will be omitted for sake of clarity. Structural component 902 is adapted to replace standard 2×4s or 2×6s for use as a structural frame member of a building. Although component 902 can be made have virtually any dimensions, in one embodiment, component 902 includes a length of about 3.5 inches and a width of about 1.5 inches. In one embodiment, component 902 includes a length of about 5.5 inches and a width of about 1.5 inches. The walls of component 902 can have a thickness similar to those discussed above for component 100.

Component 902 generally includes a first end 904 and a second end 906. A central wall 905 extends between first end 904 and second end 906, thus forming the I-beam shape. Hollow areas 909 and 911 in the structural wall component 902 provide insulating cavities and provide a high strength to weight ratio for the component. Double walls on each end of component 902 provide additional strength in the inward to outward direction of the structural wall component. In addition, the two walls provide strength for fasteners that are used to attach exterior sheathing and interior wall finishes, such as drywall. For example, fasteners (such as a nail gun or screws) can penetrate the first and/or second wall providing sufficient lateral and same-direction holding strength in the direction of the fastener.

The double walls and resulting hollow cavities, 909, 911, are symmetrical in the x-x axis, providing non-handedness of the structural wall components. This feature allows processing of structural wall components 902 with minimal bow. Channels 915, 917 are pultruded in the full length of the structural wall component 902 on either side of central wall 905 and partially defined by overhangs 922 on each end of the component 902. Channels 915, 917 provide a recess for securing electrical wires through the walls, for example. In addition, the structural wall components 902 can have holes drilled through center wall 905, such as holes 104 discussed above. Overhangs 922 further define grooves 930, 931, 932, and 933 located between each of overhangs 922 and the central wall 905.

Accordingly, to build the frame of a structure, in accordance with one embodiment, a plurality of pultruded components 100 (and/or 902) can be provided of varying lengths. A plurality of fastening components 105, and/or 150, or the connector components discussed below can also be provided.

A wall is built by attaching one end of a plurality of vertical pultruded structural members to a first-horizontal pultruded structural member and then attaching a second end of each of the plurality of vertical structural members to a second horizontal pultruded structural member. The wall can be attached to the foundation or floor by known methods and outer sheathing or inner sheetrock or other covering can be applied.

In one embodiment, the pultruded structural wall components 100 or 902 discussed above can be manufactured from a fiberglass reinforced plastic (FRP). This material provides several advantages in regards to the performance in a building wall section. FRP is an insulating material and will perform similar to wood studs and much better than steel studs. This is property is important for exterior structural wall configurations in creating the highest possible R-value. The pultruded structural wall component 100 will not create areas of highly concentrated heat conduction, which can create condensation in the wall cavities.

The pultruded structural wall components 100 or 902 can be non-electrical conducting and provides a safety feature when it comes to installation of electrical conduit and wiring through wall sections. In addition, the pultruded structural wall components do not create any electromagnetic or infra-red interference and should provide be excellent in buildings that are utilizing wireless networks.

The pultruded structural wall components 100 or 902, manufactured from FRP, are a stable material in regards to thermal and moisture changes. FRP has a coefficient of thermal expansion of $4.5 \times 10^{-6}$ in/in/degree F. This is similar to steel and wood. FRP does not warp or shrink with moisture. A common problem with wood studs is that the wood has moisture content of 7-15% when the studs are installed. As the wood studs dry out, they may twist and bow, requiring replacement during the construction process. In addition, after construction has been completed, wood studs may twist and bow, creating deflections in wall sections. Moreover, structural components 100 and 902 are suitable for structural walls of buildings since they have a tensile strength of at least about 30,000 psi. Accordingly, the structural components 100 and 902 discussed herein are readily adapted to be used as structural building products for construction of the frame of houses and other buildings since the pultruded structural components have sufficient strength so as to be used as a structural frame member of a building. For example, as used herein, "sufficient strength" means the structural component meets applicable building codes.

The pultruded structural wall components may be designed to incorporate moisture storage capabilities. The wall components can be designed to allow capture of moisture vapor and allow for quick drying to assist in keeping interior wall cavities in equilibrium and in a dry state.

Figure 11:
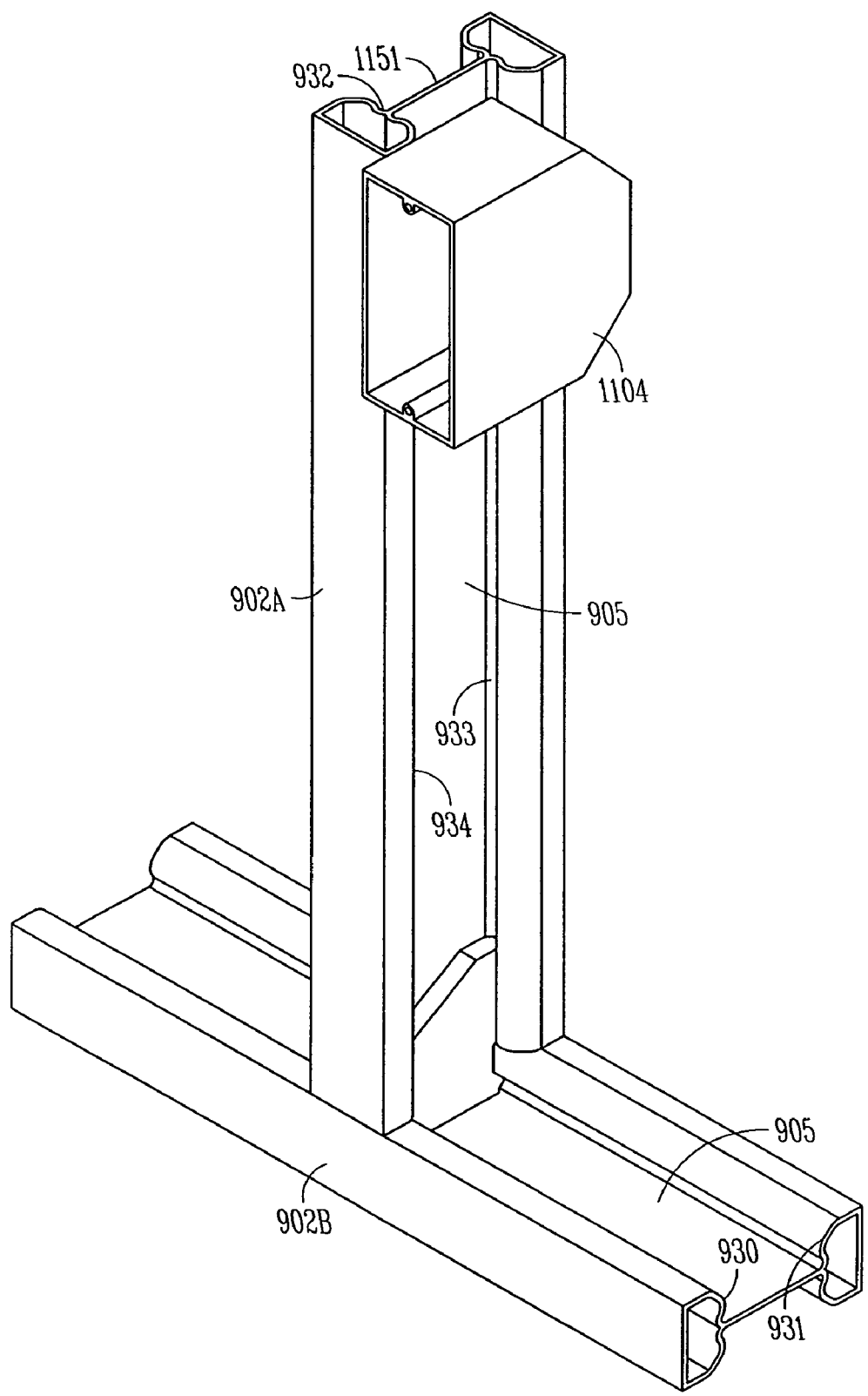
FIG. 11 shows a perspective view of a portion of a wall, in accordance with one embodiment.

FIG. 11 shows a partial wall 1100, in accordance with one embodiment. Wall 1100 is constructed using stud components 902, as discussed above. Components 902 include vertical stud component 902A and horizontal component 902B connected together at right angles using connectors 1102. Wall 1100 further includes an electrical box 1104 mounted to the upright vertical component 902A.

Figure 12:
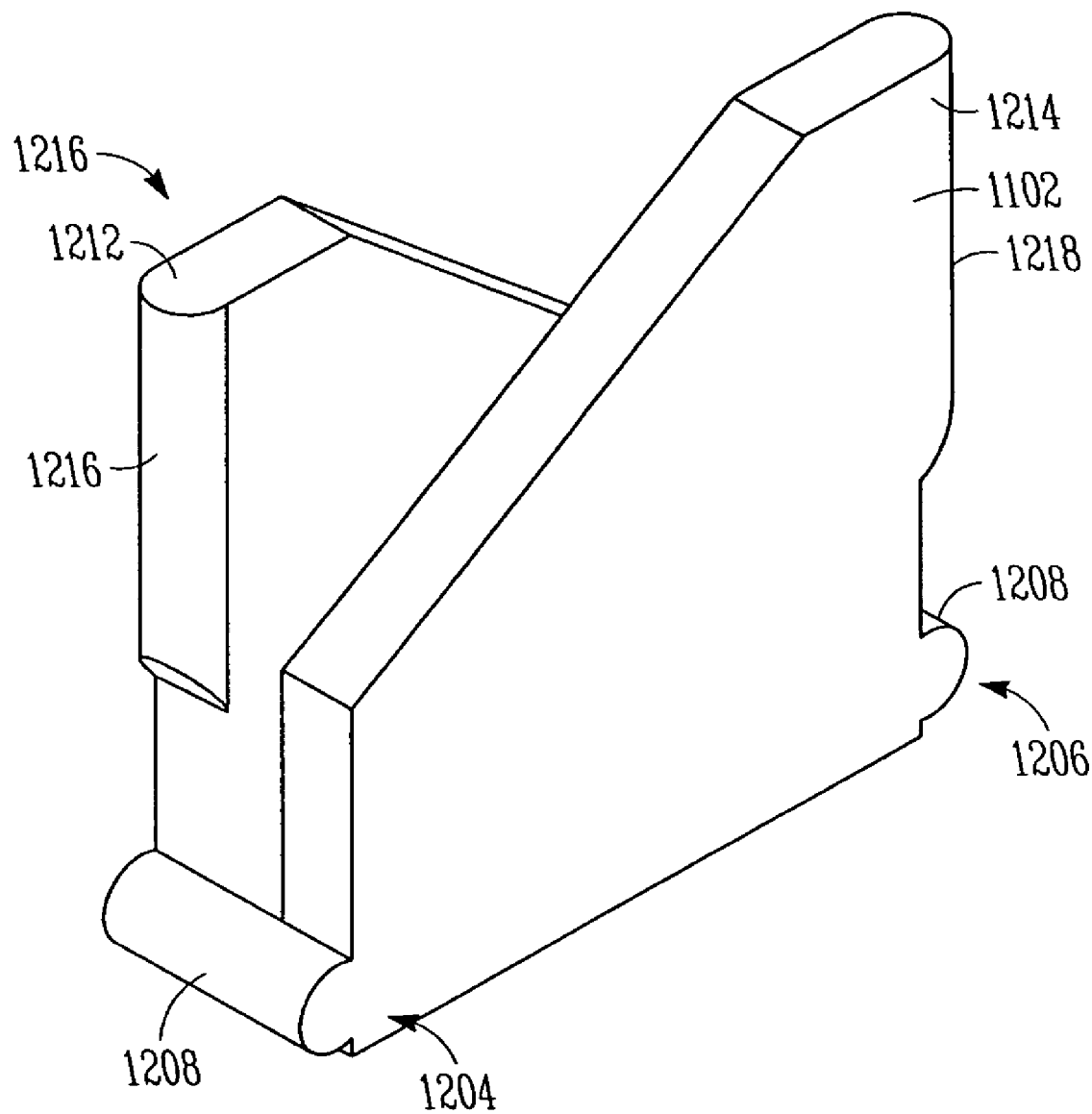
FIG. 12 shows a connector for stud components, in accordance with one embodiment.
Figure 13:
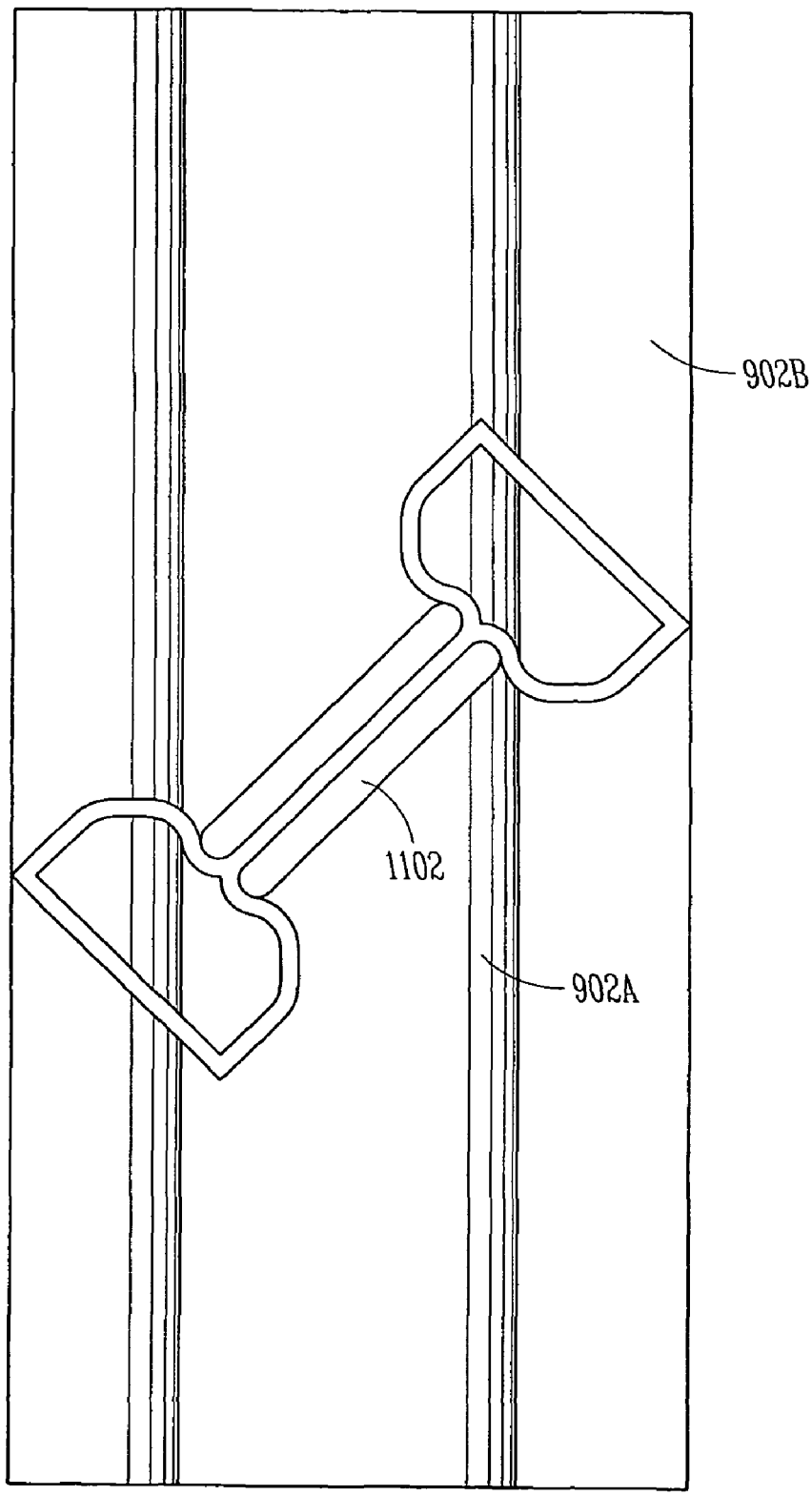
FIG. 13 shows a top, cross-section view of a pair of stud components being connected using a connector, in accordance with one embodiment.

FIG. 12 shows connector 1102, in accordance with one embodiment, and FIG. 13 shows a top, cross-section view of two stud components 902A, 902B being mounted together using connector 1102. Connector 1102 is a connecting component usable with the stud components discussed above, such as stud component 902, that allows the stud components to be connected together at right angles to each other without requiring the use of any tools. Connector 1102 can be formed from plastic, nylon, metal, or other materials.

Connector 1102 generally includes a base section 1202 having a mounting portion 1222 including first and second mounting members 1204, 1206 extending outwardly from opposite sides of the base section 1202. Mounting members 1204, 1206 are configured to tightly fit within the grooves 930, 931 on the inner sides of stud components 902B. (See FIG. 11). In one example, mounting members 1204, 1206 include fingers 1208 that are dimensioned to have a height which is just slightly higher than a height of grooves 930, 931. When connector 1102 is twisted into position so that mounting members 1204 and 1206 enter grooves 930, 931, there is a tight, frictional, snap-fit connection between the mounting members 1204, 1206 and grooves 930, 931.

Extending upward from base section 1202 of connector 1102 are first and second mounting arms 1212, 1214 separated by a gap 1215. Gap 1215 is dimensioned so that the connector 1102 tightly fits over central wall 905 of stud component 902A with first mounting arm 1212 on one side of central wall 905 and second mounting arm 1214 on the other side of the central wall with mounting portion 1222 extending from the bottom surface of component 902A.

Each of mounting arms 1212, 1214 includes a mounting finger 1216, 1218 extending outward from the respective mounting arm. The mounting fingers 1216, 1218 are dimensioned and configured to extend into and snuggly fit within grooves 932, 933 of stud components 902A. In this example, each mounting arm 1212, 1214 includes one mounting finger 1216, 1218, such that when the connector 1102 is mounted over central wall 905 of stud component 902A, first mounting finger 1216 fits within groove 932 and second mounting finger 1218 fits within groove 933 on the other side of central wall 905.

Other embodiments, can include mounting fingers on both sides of each of mounting arms 1212, 1214, such that the four mounting fingers would be mounted within all four grooves of stud component 902A.

To use stud connector 1102, the connector 1102 is slid over central wall 905 so that mounting arm 1212 is on one side of the central wall 905 with its mounting finger 1216 located in a groove 932, and mounting arm 1214 is on the other side of central wall 905 with its mounting finger 1218 located within groove 933. The first component 902A is then placed above component 902B with component 902A being angled about 45 degrees or more relative to its final position. Component 902A is then turned on the axis perpendicular to component 902B so that mounting members 1204, 1206 enter grooves 930, 931 of component 902B.

This connection system utilizing stud components 902A and 902B and connectors 1102 allows a frame or wall to be build which requires no tools and is simple and results in a naturally square frame or wall.

Figure 14:
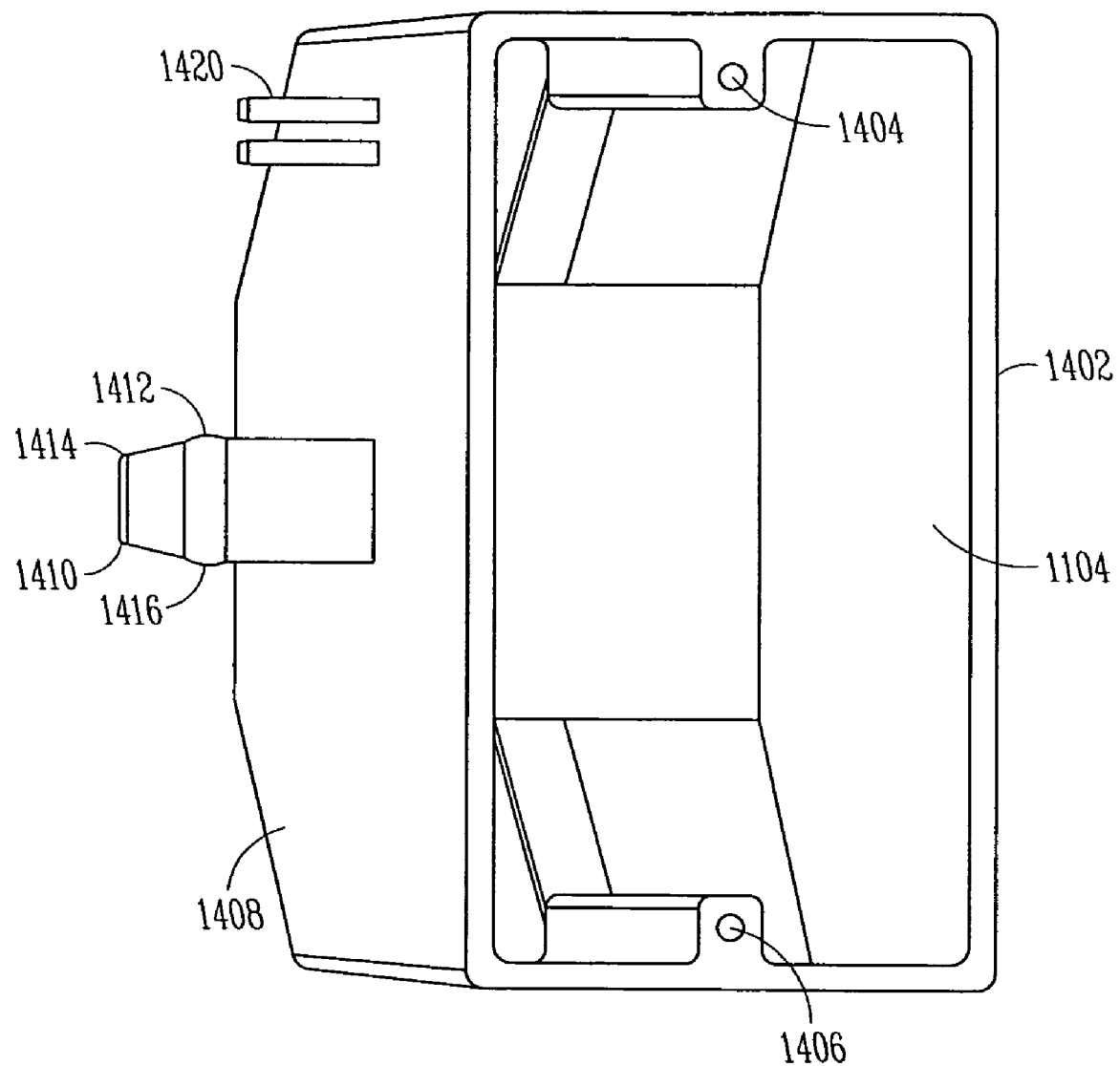
FIG. 14 shows a perspective view of an electrical box, in accordance with on embodiment.

FIG. 14 shows further details of electrical box 1104, in accordance with one embodiment. Electrical box 1104 includes a generally rectangular box portion 1402 dimensioned as the standard electrical codes require. A pair of mounting holes 1404, 1406 are provided to mount electrical fixtures and faceplates to the electrical box. Extending from a side wall 1408 of electrical box 1104 is mounting member 1410. Mounting member 1410 includes an arm 1412 extending from wall 1408. On each side of arm 1412 is a mounting finger 1414, 1416. Mounting fingers 1414, 1416 are dimensioned and configured to tightly fit within grooves 932, 934 of stud component 902A, in a similar fashion as mounting members 1204, 1206 of connector 1102 discussed above (see FIGS. 11 and 12). As the electrical box is twisted into position with stud component 902A, the mounting fingers 1414, 1416 enter grooves 933, 934 and tightly and frictionally hold the electrical box in place.

In one embodiment, a stop member 1420 extends from an upper portion of the side wall 1408. Stop member is dimensioned and located so that the stop member 1420 contacts the surface 1151 of the stud component when the electrical box is correctly positioned to keep the installer from turning the electrical box too far when installing the box.

In other embodiments, connector 1102 and electrical box 1104 can have mounting sections and mounting fingers dimensioned and configured to work with stud component 100 (FIG. 1) discussed above.

Figure 10:
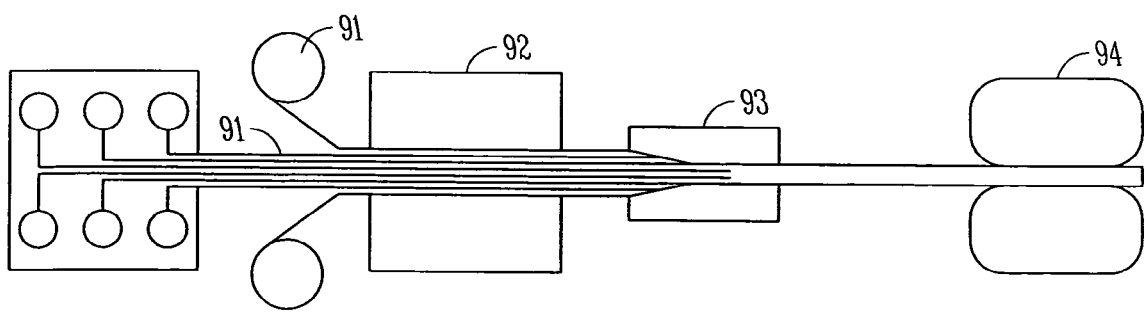
FIG. 10 shows a schematic representation of a pultrusion line in accordance with one embodiment.

In some embodiments, structural wall components, 100 and 902, can be pultruded and formed as composite parts. FIG. 10 shows a diagrammatic view of a pultrusion production line, in accordance with one embodiment. For example, glass, or other reinforcing fibers 91, are impregnated with resin and pulled through a forming guide 92 and a heated die 93. The forming guide orients fibers to be properly placed in the heated die to insure that the pultruded part has uniform reinforcement across its shape. The heated die cures and/or solidifies the resin around the reinforcing fibers, thus forming the composite part. The composite part, having a profile shape, is continuously pulled out of the heated die by a puller 94. The puller can be a clamp and stroke action from a reciprocating puller, or a smooth action from a caterpillar puller.

Reinforcing fibers 91 used in the example pultrusions can be glass, carbon fiber, kevlar, and other organic and inorganic filaments and fibers. Reinforcement fibers can take the form of filament and strand bundles, called rovings. They also take the form of yams, texturized yams, chopped strand mats, continuous strand mats, knitted mats, woven mats, surfacing veils, and many hybrid combinations of rovings, yams and mats, and veils.

Resin used in example pultrusions can be thermosetting resins like unsaturated polyesters in a styrene solution, or polyurethanes, phenolics, epoxides, thermosetting blends, and other thermosetting resins. Other resins used in pultrusion can be thermoplastic resins based on polyurethanes, acrylics, polyethylenes, plastisols and other thermoplastic resins. Resin used in pultrusion can also be thermoplastic resins that are embedded in rovings or reinforcement materials that melt and form the part inside the pultrusion die.

Resin mixtures in pultrusion can also contain organic, polymeric, and inorganic additives for such properties as shrink control, mold lubrication, colorants, fillers and other additives.

The above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A structural building system comprising:
a plurality of pultruded fiberglass reinforced structure components configured to be used as a structural frame member of a building, wherein each of the pultruded fiberglass reinforced structure components includes a central wall and four grooves running longitudinally along the length of the pultruded component with two opposing grooves on each side of the central wall; and
a plurality of connectors, each connector configured to be mounted to one end of a first pultruded structural component and including a frictional mounting section that is couplable to a second pultruded structural component so as to connect the first and second structural components at right angles to each other; and
wherein the connectors include first and second mounting arms separated by a gap, the first mounting arm includes a first finger and the second mounting arm includes a second finger, and wherein the connector is mounted to the central wall of the first pultruded structural component with the first mounting arm on a first side of the wall and the second mounting arm on a second side of the wall, and wherein the first finger is mounted within a first groove on the first side of the wall and the second finger is mounted within an opposing, second groove on the second side of the wall, wherein the mounting arms are asymmetric with respect to each other such that there are no fingers on the opposite side of each of the fingers.

2. The structural building system of claim 1, wherein each of the connectors further includes two mounting members extending from opposite sides of the connector and configured to mount within two opposing grooves of the four grooves of the second pultruded structural component.

3. The structural building system of claim 1, wherein the pultruded components each include a pultruded profile having outer perimeter dimensions of either about 1.5 inches × about 5.5 inches or of about 1.5 inches × about 3.5 inches.

4. The structural building system of claim 1, wherein each of the pultruded components includes a pultruded profile formed in an I-beam shape having a first side and a second side and a central wall extending from the first side to the second side, and including a hollow area at each end of the pultruded member.

5. A connector comprising:
a base portion including a first mounting arm and a second mounting arm extending from the base portion and having a gap therebetween, and a first mounting member extending from a first side of the base portion and a second mounting member extending from a second, opposing side of the base portion;
wherein the first and second mounting arms of the connector are configured to mount to an end of a first structural stud component and the first and second mounting members are configured to mount to a second structural stud component positioned perpendicular to the first structural stud component; and
the first mounting arm includes a first finger and the second mounting arm includes a second finger, and wherein the connector is configured to be mounted to a central wall of the first structural stud component with the first mounting arm on a first side of the wall and the second mounting arm on a second side of the wall, and wherein the first finger is mounted within a first groove on the first side of the wall and the second finger is mounted within an opposing, second groove on the second side of the wall, wherein the mounting arms are asymmetric with respect to each other such that there are no fingers on the opposite side of each of the fingers.

6. The connector of claim 5, wherein the first and second mounting members are configured to frictional mount to the second structural stud component.

* * * * *